United States Patent [19]
Inui et al.

[11] Patent Number: 5,906,088
[45] Date of Patent: May 25, 1999

[54] ELECTRIC LAWN MOWER

[75] Inventors: Tsutomu Inui; Norikazu Shimizu, both of Wako, Japan

[73] Assignee: Honda Giken Kogyo Kabushiki Kaisha, Tokyo, Japan

[21] Appl. No.: 08/755,471

[22] Filed: Nov. 22, 1996

[30]    Foreign Application Priority Data

Nov. 24, 1995  [JP]  Japan .................................. 7-305824
Oct. 28, 1996  [JP]  Japan .................................. 8-285021

[51] Int. Cl.$^6$ ........................... A01D 75/28; A01D 69/00
[52] U.S. Cl. ......................... 56/10.2 R; 56/10.8; 56/11.9
[58] Field of Search ............................... 56/11.9, 10.2 R, 56/10.8, 16.7, 16.9

[56]          References Cited

U.S. PATENT DOCUMENTS

| | | | |
|---|---|---|---|
| 4,673,851 | 6/1987 | Disser | 318/341 |
| 4,987,729 | 1/1991 | Paytas | 56/11.9 |
| 5,412,293 | 5/1995 | Minezawa | 318/376 |
| 5,442,901 | 8/1995 | Niemela et al. | 56/11.9 |
| 5,502,957 | 4/1996 | Robertson | 56/11.9 |

FOREIGN PATENT DOCUMENTS

2923272  12/1980  Germany .............................. 56/11.9

*Primary Examiner*—Eric K. Nicholson
*Assistant Examiner*—Gary Grafel
*Attorney, Agent, or Firm*—Nikaido, Marmelstein, Murray & Oram LLP

[57]           ABSTRACT

A battery driven electric lawn mower includes a DC motor, and mowing blade on an output shaft of the motor. A control unit is connected between the motor and the battery for increasing and decreasing the electric current supplied to the motor in accordance with an increase and decrease in load, to thereby maintain the number of revolutions per second of the motor substantially constant at or near a minimum value permitting a mowing blade to function normally under a heavy load. The control unit comprises an electric current detecting device for detecting a load current flowing in the motor, and a pulse generating device for outputting a pulse signal having a pulse width corresponding to an electric current value detected by the electric current detecting device. A pulse-responsive switch device for adjusting the electric current supplied to the motor in response to a pulse signal output from the pulse generating device. The pulse responsive switch device is connected in series with the motor. A duty ratio of the pulse signal output from the pulse generating device is increased in accordance with an increase in electric current detected by the electric current detecting device.

3 Claims, 9 Drawing Sheets

Electric current detected
(use of battery of rated 24 volts)

ELECTRIC LAWN MOWER

BACKGROUND OF THE INVENTION

1. Field of the Invention

The present invention relates to an electric lawn mower of a battery driven type, comprising a DC motor provided at an output shaft thereof with a mowing blade, and a battery connected to the DC motor.

2. Description of the Related Art

The demand for electric lawn mowers has significantly increased in recent years, particularly in the suburbs because of the fact that electric mowers make less noise and produce less pollution than gas-powered lawn mowers.

Electric lawn mowers include a battery driven type (DC type) and a power cord type (AC type). The AC type is popular due to the fact that a reliable power source can easily be insured. However, the power cord or AC type is inconvenient to handle, because a power cord must be dragged around the lawn during mowing, and additionally, the power cord has a drawback that its working area is limited due to a limit in the length of the power cord.

By contrast, the battery driven type (for example, see Japanese Patent Application Laid-open Nos. 4-360615 and 5-192027) is easy to handle, because it does not have a cord which must be dragged around, and moreover, the working site is not limited. On the other hand, however, the battery driven type has a drawback that the battery capacity is limited, whereby the working time or the area to be mowed must be limited, and in actuality lawn mowing can only be carried out in a small area with an amount of electricity charged in the battery in single charge.

In a conventionally known electric lawn mower disclosed, for example, in Japanese Patent Application Laid-open No. 5-192027, there is provided a revolution-number sensor mounted to an output shaft of a motor or to a driving shaft for a mowing blade in order to maintain the number of revolutions of the motor at a certain constant value during working by the lawn mower. An electric current supplied to the motor is controlled in response to a signal output from the sensor. In such a lawn mower, however, the revolution-number sensor and the wiring connected thereto are typically located in rugged environments where there is dust, dirt, mud, water, and lawn cuttings scooped up by the mowing blade. For this reason, dust-proof and water-proof means must be provided for the sensor and the wiring. A significant increase in cost is incurred as a result, which is in addition to the expense of the sensor.

SUMMARY OF THE INVENTION

Accordingly, it is an object of the present invention to provide a battery driven electric lawn mower, wherein the limited power of a battery can efficiently be utilized to operate a motor over long periods of time, and it is possible to mow larger areas wherein the number of revolutions of the motor can be properly controlled without requiring a revolution-number sensor.

To achieve the above object, according to a first embodiment of the present invention, a battery driven electric lawn mower includes a DC motor provided at an output shaft thereof with a mowing blade, and a battery connected to the DC motor. The lawn mower includes a control unit which is connected between the motor and the battery for increasing and decreasing the electric current supplied to the motor in accordance with an increase and decrease in load. The control unit maintains the number of revolutions of the motor substantially constant at a minimum value for effective grass cutting, permitting a mowing blade to normally function even in a heavy load, or at a value near the minimum value.

With the first feature of the present invention, under a heavy load, the consumption of power can be suppressed to a minimum limit enabling the effective mowing of lawn, and under lighter loads, an increase in number of revolutions of the motor is suppressed to reduce power consumption to a minimum amount necessary. In addition, a variation in consumed power relative to a variation in load can be decreased and as a result, the limited power of the battery can efficiently be used to prolong the operation time of the motor and therefore enable mowing of larger areas. Moreover, because the number of revolutions of the motor is controlled substantially constant and at a low speed, the generation of noise by the mowing blade moving through the air can be suppressed, and uneven mowing can be decreased.

According to a second aspect and feature of the present invention, the control unit is provided with an electric current detecting means for detecting a load current flowing in the motor. A pulse generating means outputs a pulse signal having a pulse width corresponding to an electric current value detected by the electric current detecting means, and a pulse-responsive switch means for energizing a feed circuit provided between the motor and the battery in response to a pulse signal outputted from the pulse generating means. The duty ratio of the pulse signal outputted from the pulse generating means is increased in accordance with an increase in electric current detected by the electric current detecting means.

With the second feature of the present invention, the number of revolutions of the motor can be maintained substantially constant at or near the minimum value without provision of a revolution-number sensor for detecting the number of revolutions of the output of the motor. Moreover, the location for placement of the control unit is, unlike the revolution-number sensor, essentially unlimited. Therefore, the control unit can be placed in a good environment, whereby its durability can be easily enhanced. Also, the wiring can be simplified which, in combination with eliminating the sensor, provides a significant reduction in cost.

Further, according to a third aspect and feature of the present invention, the voltage of the battery is detected by the pulse generating means, and the duty ratio of the pulse signal outputted from the pulse generating means is increased in accordance with a drop of the detected voltage. With this feature, when the voltage of the battery drops, the width of the pulse output from the pulse generating means is corrected to compensate for a deficiency of electricity supplied to the motor, thereby preventing an undesirable decrease in number of revolutions of the motor.

According to a fourth aspect and feature of the present invention, a solar cell is connected to the motor in parallel to the battery. The service time or usable time of the battery can be prolonged by driving the motor through cooperation of the solar cell and the battery, or by driving the motor via the battery while charging the battery with the output of the solar cell.

According to a fifth aspect and feature of the present invention, there is provided an electric lawn mower of a battery driven type, comprising a DC motor provided at an output shaft thereof with a mowing blade, and a battery connected to the DC motor. The lawn mower further includes a control unit which is connected between the motor and the battery for controlling the electric current supplied to the motor. The control unit is provided with an electric current detecting means for detecting a load current flowing in the motor, and a pulse generating means for outputting a pulse signal having a pulse width corresponding to an electric current value detected by the electric current detecting means. A pulse-responsive switch means is provided for energizing a feed circuit provided between the motor and the battery in response to a pulse signal outputted from the pulse generating means. The duty ratio of the pulse signal outputted from the pulse generating means is increased in accordance with an increase in electric current detected by the electric current detecting means. The voltage of the battery is detected by the pulse generating means, and the duty ratio of the pulse signal outputted from the pulse generating means is increased in accordance with a drop of the detected voltage.

With the fifth feature of the invention, the number of revolutions of the motor can be maintained substantially constant at the minimum value without provision of a revolution-number sensor for detecting the number of revolutions of the output shaft of the motor. A decrease in number of revolutions of the motor due to a drop in the voltage of the battery can therefore be avoided or minimized.

The above and other objects, features and advantages of the invention will become apparent from the following description of preferred embodiments taken in conjunction with the accompanying drawings.

DETAILED DESCRIPTION OF THE PREFERRED EMBODIMENTS

The present invention will now be described by way of preferred embodiments, with reference to the accompanying drawings.

Figure 1:
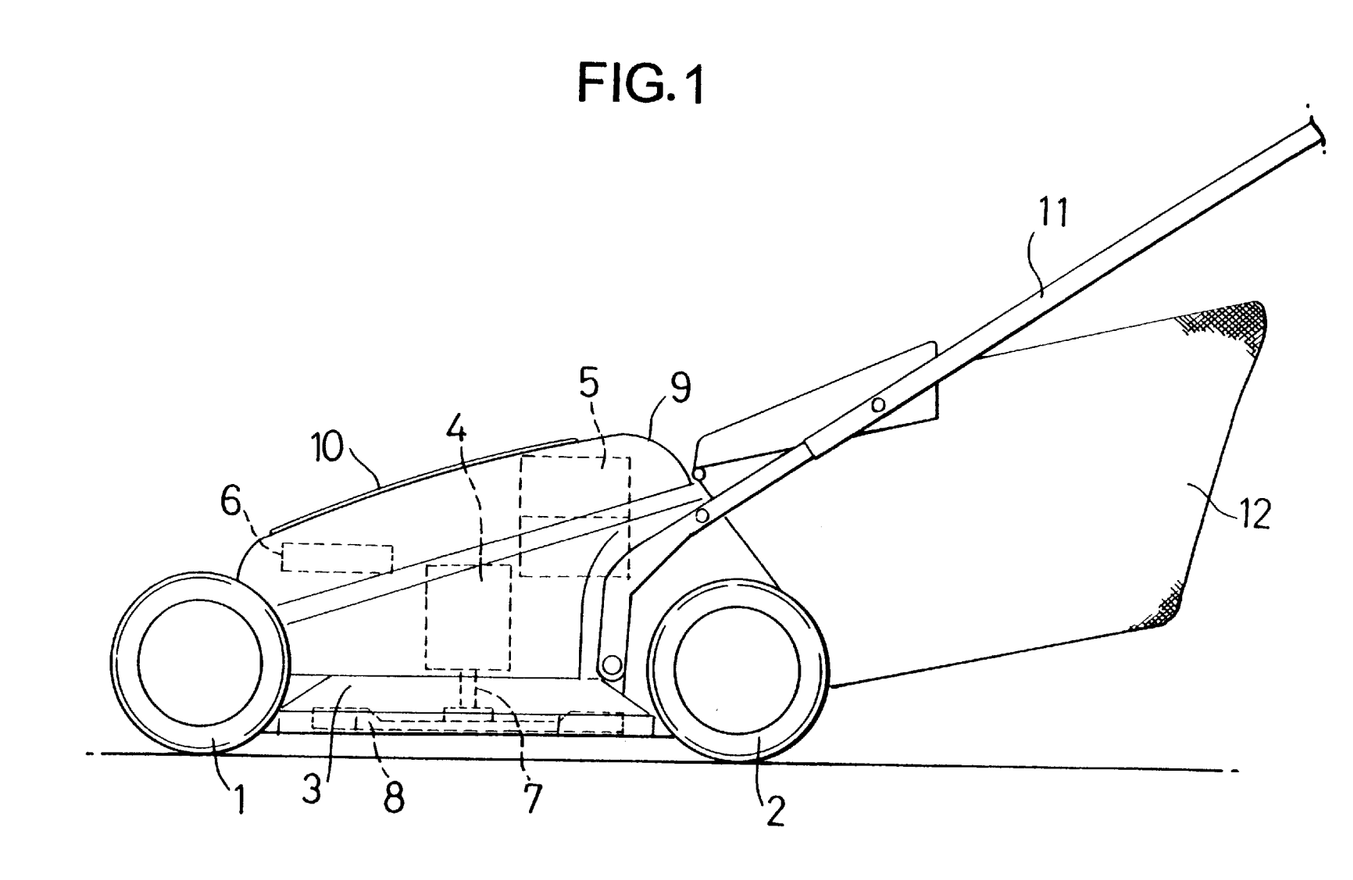
FIG. 1 is a side view of an electric lawn mower of a battery driven type according to a first embodiment of the present invention.
Figure 2:
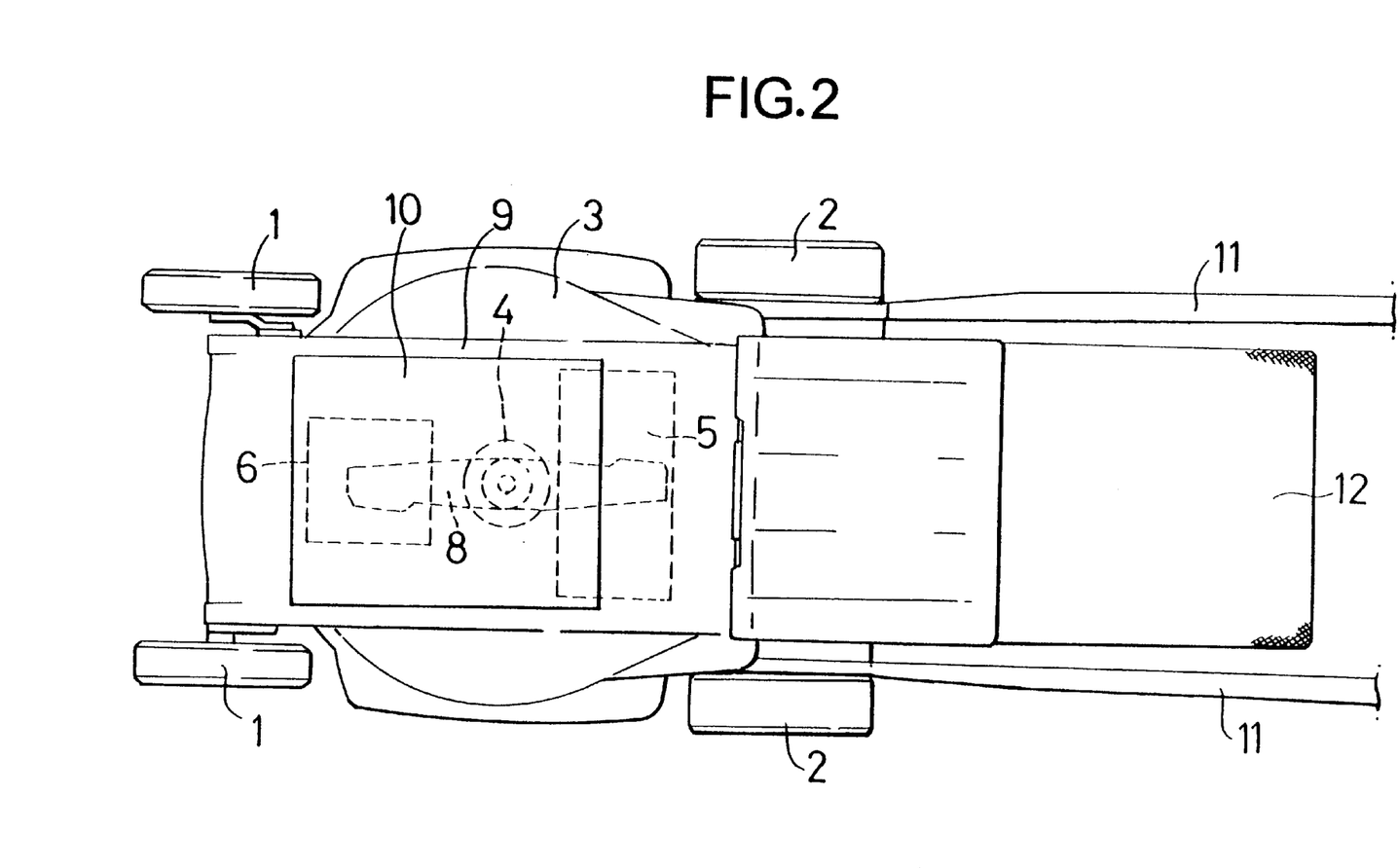
FIG. 2 is a plan view of the electric lawn mower.

A first embodiment of the present invention will be described, with reference to FIGS. 1 to 5 and 7. FIGS. 1 and 2 are a side view and a plan view of an electric lawn mower of a battery driven-type. A DC motor 4, a battery 5 serving as a power source for the motor 4 and a control unit 6 for controlling the electric current supplied from the battery 5 to the motor 4 are mounted on a machine body 3 supported on a pair of left and right front wheels 1, 1 and a pair of left and right rear wheels 2, 2. The motor 4 is disposed with a tip end of an output shaft 7 thereof being directed downwards, and a mowing blade 8 is mounted at the tip end of the output shaft 7.

A solar cell 10 is placed on an upper surface of a hood 9 for covering the motor 4, the battery 5, the control unit 6 and the like.

Steering handles 11 are secured to the machine body 3, and grass bag 12 is provided for accommodating grass cut by the mowing blade 8.

Figure 3:
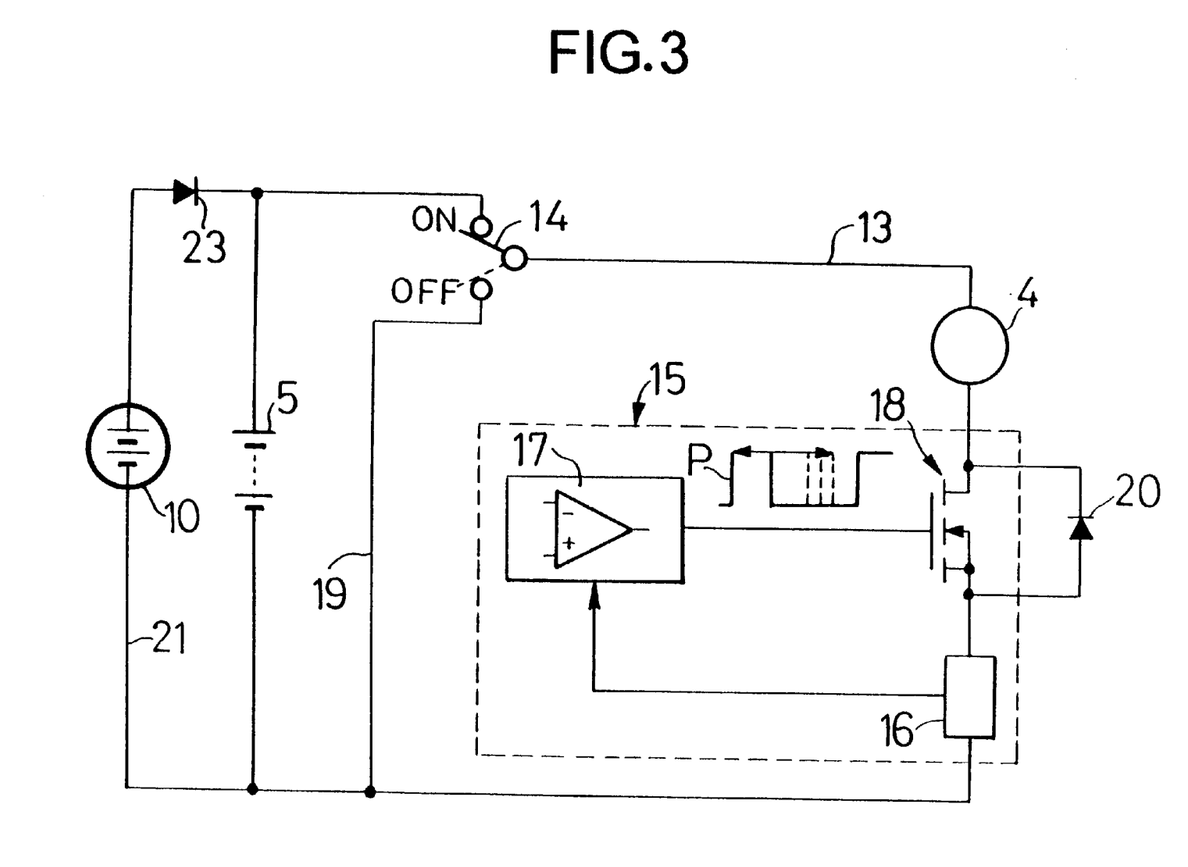
FIG. 3 is a diagram of an electric circuit for driving a DC motor in the electric lawn mower.

FIG. 3 shows an electric circuit for driving the motor 4. A main switch 14 and a control unit 15 are incorporated in series in a feed circuit 13 interconnecting the motor 4 and the battery 5.

The control unit 15 includes an electric current detecting means 16 for detecting a load current flowing in the motor 4, a pulse generating means 17 for outputting a pulse signal P having a pulse width corresponding to an electric current value detected by the electric current detecting means 16, and a pulse-responsive switch means 18 for energizing the feed circuit 13 in response to the output pulse signal from the pulse generating means 17.

Figure 4:
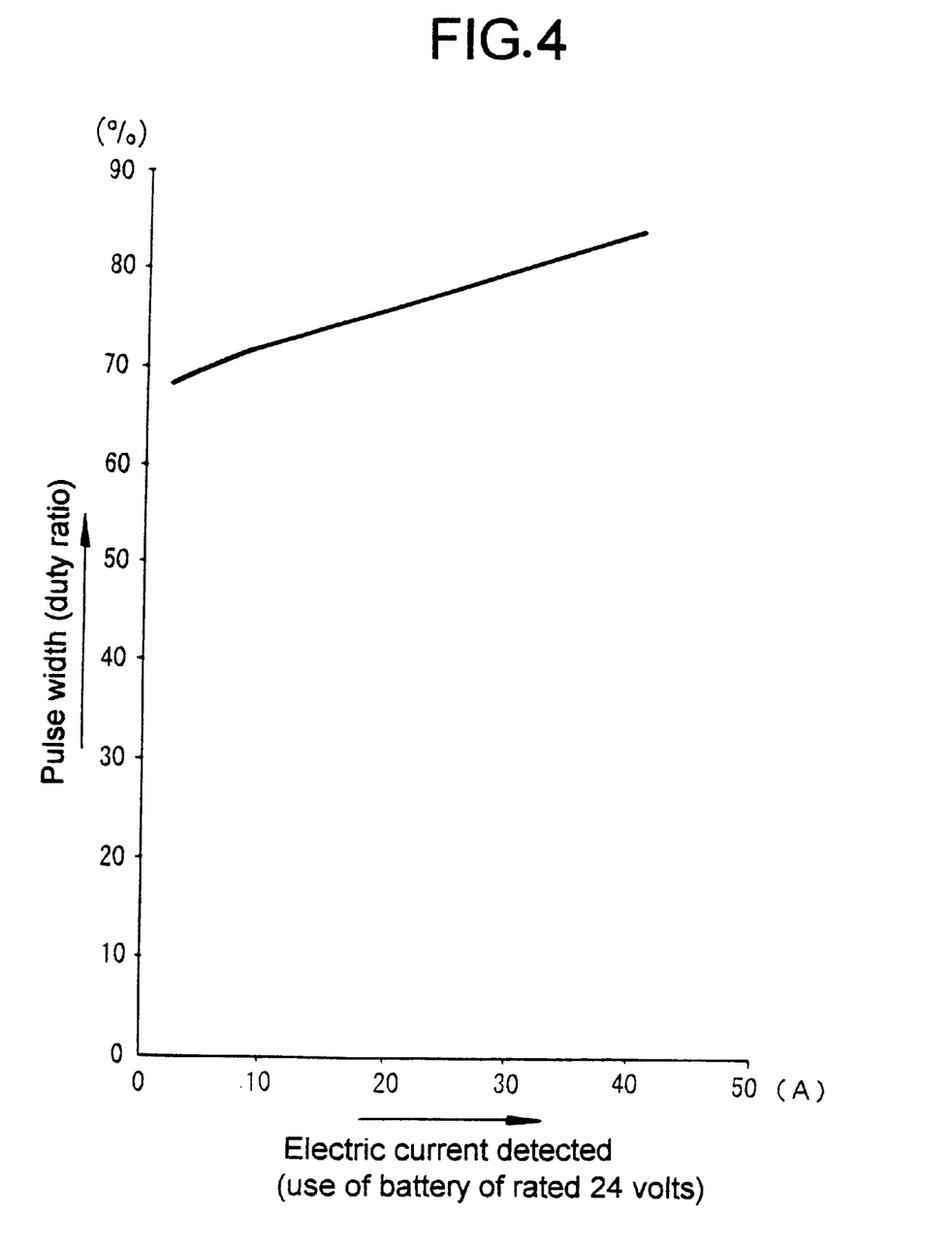
FIG. 4 is a graph illustrating a characteristic of electric current detected by a pulse generating means and pulse width in the electric circuit.

The pulse generating means 17 controls the ON time of the pulse-responsive switch means 18 in response to the output pulse signal P to maintain the number of revolutions of the motor 4 substantially constant at a preset low revolution-number. This preset revolution-number is a lowest number of revolutions permitting the mowing blade 8 to normally function even in a heavy load working mode such as a mowing of a wet lawn, or a number of revolutions which is near the lowest number of revolutions. One example of a previously established current-pulse width characteristic of the pulse generating means 17 is shown in FIG. 4. The pulse-responsive switch means 18 includes a switching element such as a power MOS type FET, SCR or the like.

A dynamic braking circuit 19 is connected to the feed circuit 13 in parallel to the battery 5 and adapted to be closed in an OFF position of the main switch 14, and a diode 20 is also connected to the feed circuit 13 in parallel to the pulse-responsive switch means 18. The diode 20 permits the flow of an electric current in an opposite direction in the feed circuit 13.

A second feed circuit 21 is connected to the feed circuit 13 in parallel to the battery 5, and the solar cell 10 and a diode 23 are included in the second feed circuit 21. The diode 23 inhibits a discharge from the battery 5 to the solar cell 10.

The operation of this embodiment will be described below.

If the main switch 14 is now turned ON position in order to mow a lawn, the motor 4 is operated by electricity supplied from the battery 5 to rotate the mowing blade 8. Thus, the lawn can be mowed, and the steering handle 11 is operated to steer the mower.

During operation of the motor 4, a load current flowing in the motor 4 is detected by the electric current detecting means 16, and an output pulse signal P having a width corresponding to the detected current value is output from the pulse generating means 17 to the pulse-responsive switch means 18. In response to this, the electric supply to the motor 4 is controlled. Therefore, if a load applied to the mowing blade 8 is increased, the load current flowing in the motor 4 is necessarily increased. Hence, the width of the output pulse P from the pulse generating means 17 is increased in accordance with the current value detected by the electric current detecting means 16, i.e., the duty ratio is increased to prolong the ON time of the pulse-responsive switch means 17 to increase the electric current supplied to the motor 4. Thus, the number of revolutions of the motor 4 is substantially maintained at the above-described preset lower number of revolutions. Therefore, even heavy loads such as the mowing of a wet lawn can be effectively performed, while minimizing the increase in amount of power consumed by the mower.

In contrast, if the load applied to the mowing blade 8 is decreased, the load current flowing to the motor 4 is necessarily decreased. Therefore, the width of the output pulse signal P from the pulse generating means 17 is decreased in accordance with the electric current value detected by the electric current detecting means 6, i.e., the duty ratio is decreased to shorten the ON time of the pulse-responsive switch means 18 to decrease the electric current supplied to the motor 4. Therefore, the number of revolutions of the motor 4 is substantially maintained at the above-described preset lower number of revolutions. During light-load work, an increase in number of revolutions of the motor 4 is suppressed, leading to significant power savings.

Figure 7:
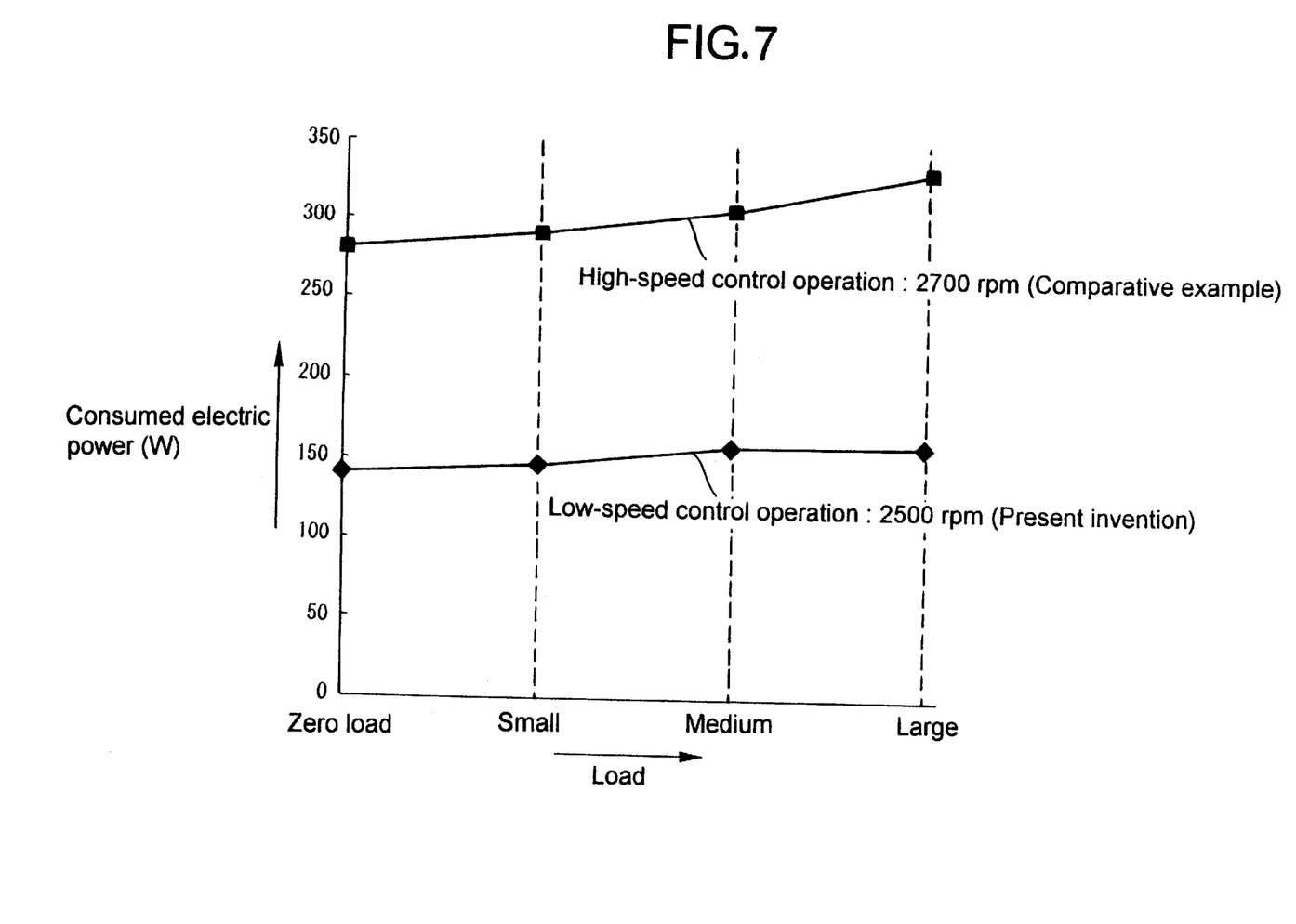
FIG. 7 is a diagram showing a characteristic of consumed power of the motor relative to the load.
Figure 8:
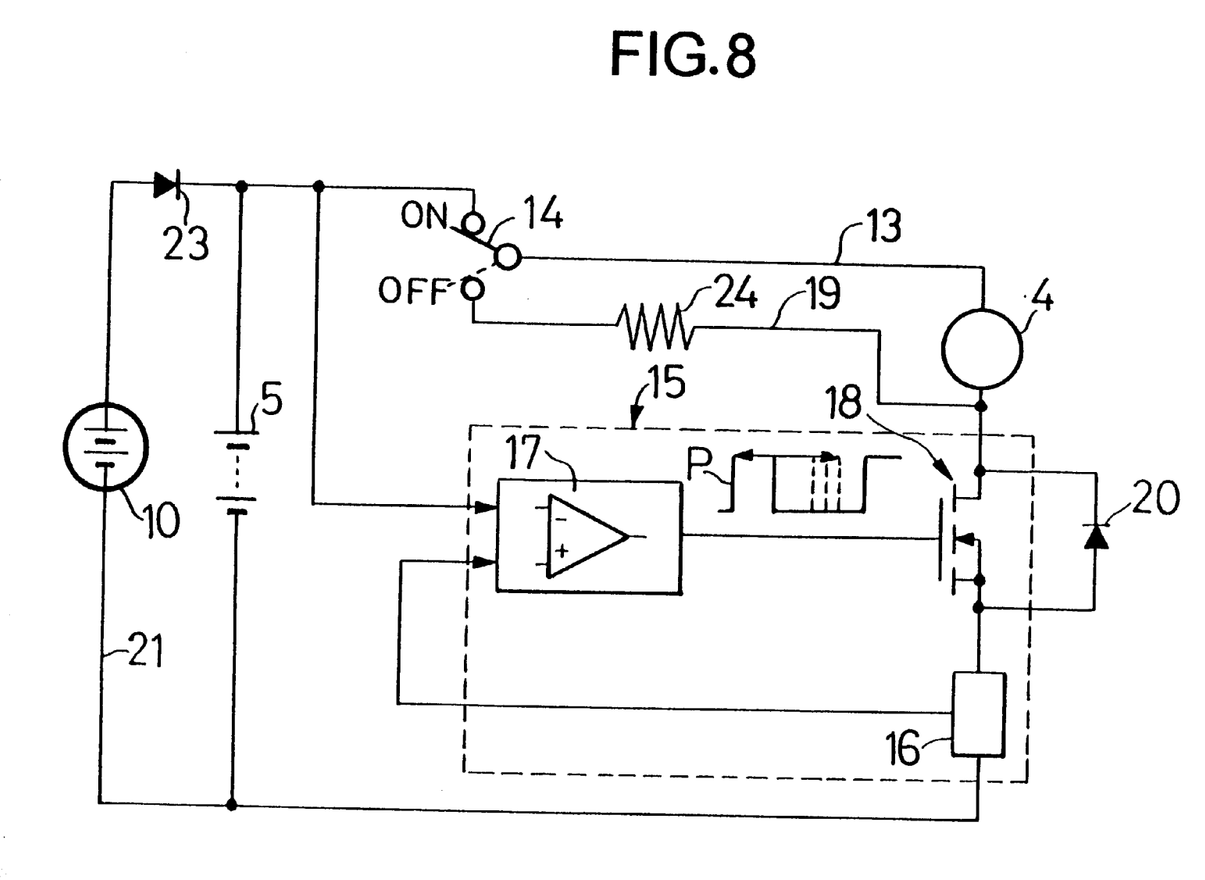
FIG. 8 is a diagram of an electric circuit for driving a DC motor, similar to FIG. 3, but according to a second embodiment of the invention.
Figure 9:
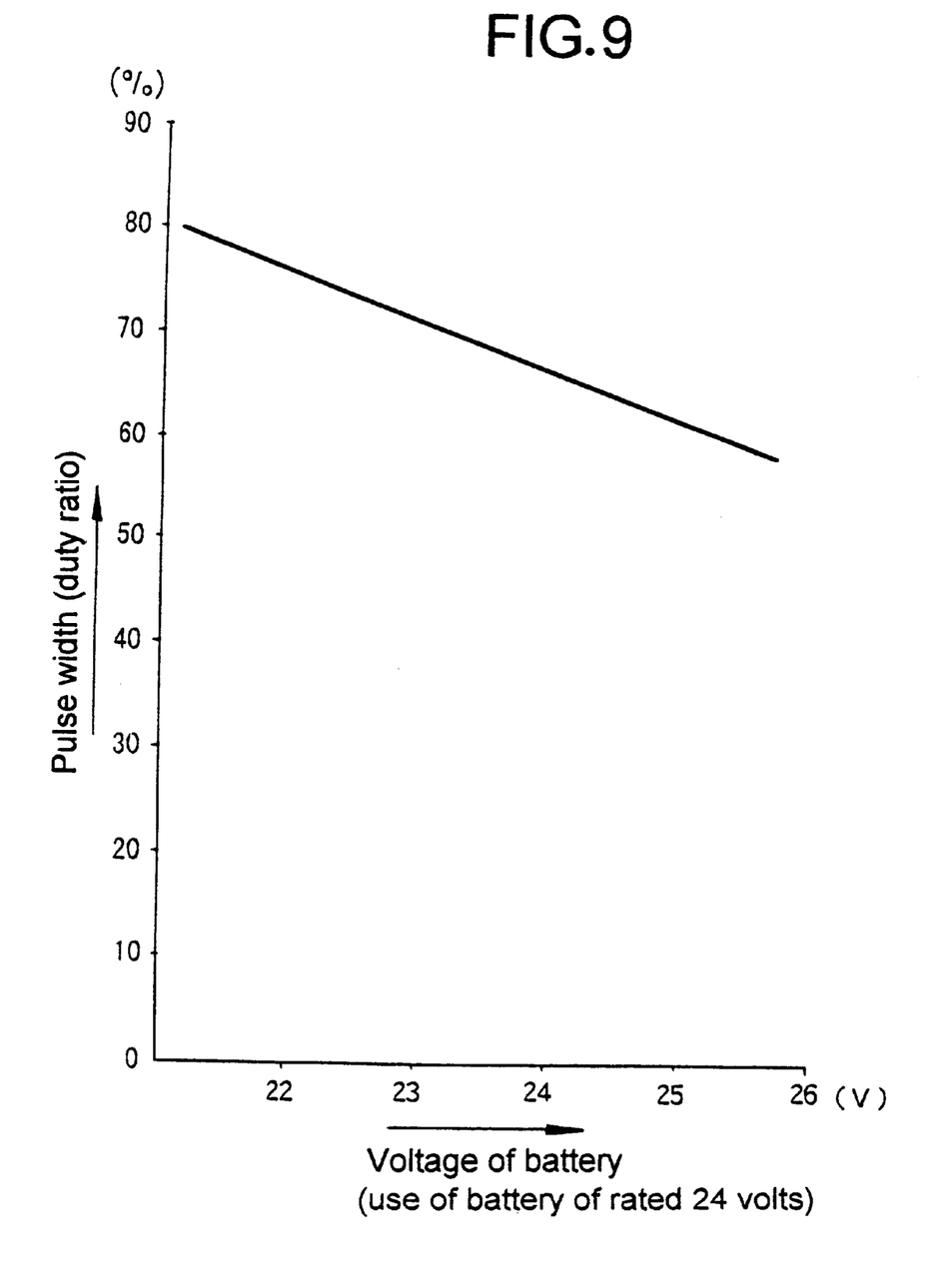
FIG. 9 is a graph of a characteristic of width of pulse output from a pulse generating means relative to the voltage of a battery in the electric circuit.

In a case where the motor 4 was operated while being controlled at a low speed (2,500 rpm) according to this embodiment of the present invention, and in a case where the motor was operated while being controlled at a higher speed (2,700 rpm) as a comparative example, a variation in consumed power at the time when the load to the mowing blade 8 was varied from a zero value to a small value, a medium value and a large value was tested to provide results shown in FIG. 7 and Tables 1 and 2.

TABLE 1

Consumed power by load (unit: W)

| Load Condition | Low Speed Operation | High Speed Operation |
| --- | --- | --- |
| Zero load | 141 | 281 |
| Small load | 146 | 291 |
| Medium load | 158 | 306 |
| Large load | 160 | 332 |

TABLE 2

Maximum amount of variation in consumed power (unit: W)

| Difference | Low Speed Operation | High Speed Operation |
| --- | --- | --- |
| Large-zero load | 19 | 51 |

As apparent from the test results, the variation in consumed power relative to the variation in load is smaller during low speed operation than during high speed operation. It is believed that this is due to the fact that the shock force received by the mowing blade 8 from the grass of the lawn during low speed operation is smaller than during the high speed operation. This means that the variation in number of revolutions of the motor 4 due to the variation in load is smaller during low speed operation than during high speed operation. In this way, the smaller variation in number of revolutions results in a decreased unevenness of mowing of the lawn, and the lower number of revolutions reduces the wind noise generated by the mowing blade 8.

The electric lawn mower according to this embodiment of the present invention, in which the electric current supplied to the motor 4 is controlled so as to control the number of revolutions of the motor to a substantially constant value as described above, will next be compared in respect of the characteristic with a conventional lawn mower having no speed control function.

Figure 5:
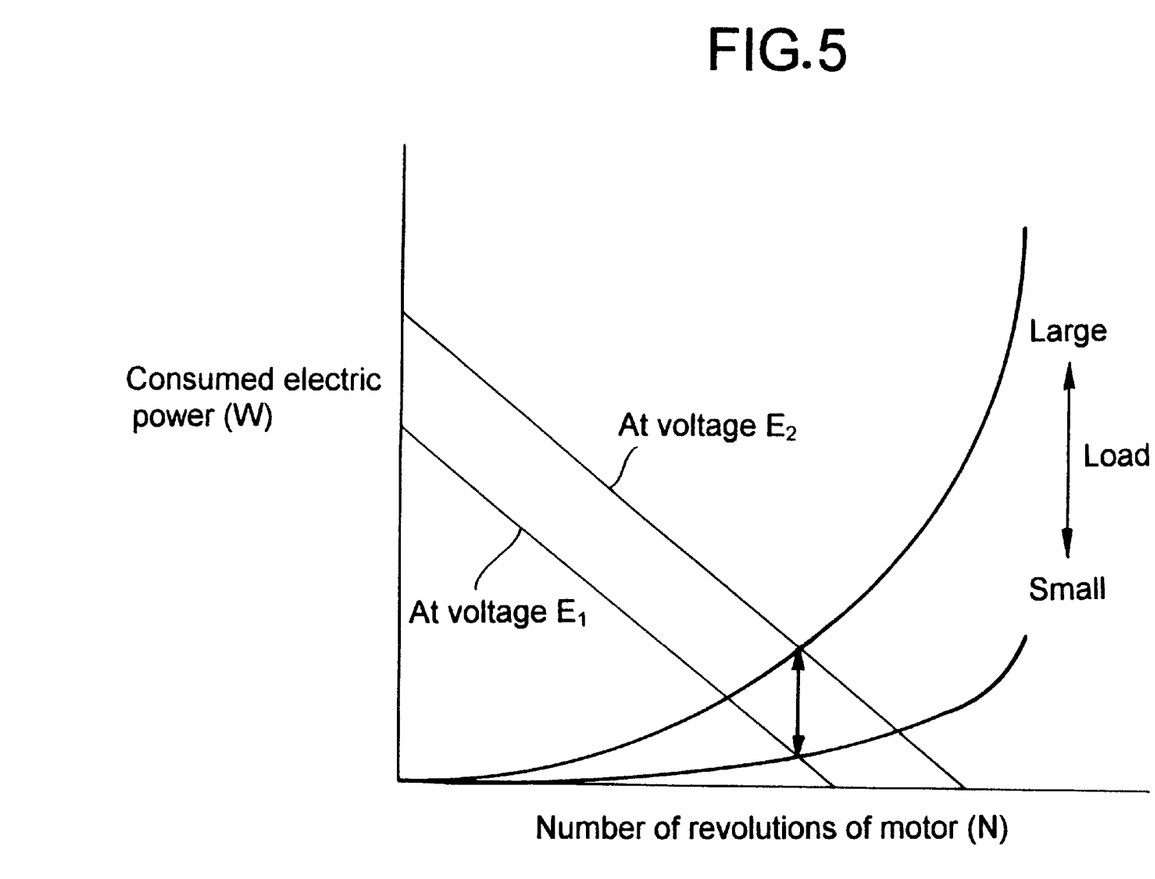
FIG. 5 is a graph illustrating a characteristic of number of revolutions of the motor and consumed power, showing that the speed of the motor is regulated substantially in accordance with a variation in voltage in the electric circuit.

In the electric lawn mower according to the embodiment of the present invention, when the number of revolutions of the motor due to the variation in load applied to the mowing blade 8 is varied, the rising and lowering of the voltage applied to the motor 4 are substantially controlled between $E_1$ and $E_2$ by increasing and decreasing the duty ratio of the pulse generating means 18, as shown in FIG. 5, thereby controlling the number of revolutions of the motor 4 to be substantially constant.

Figure 6:
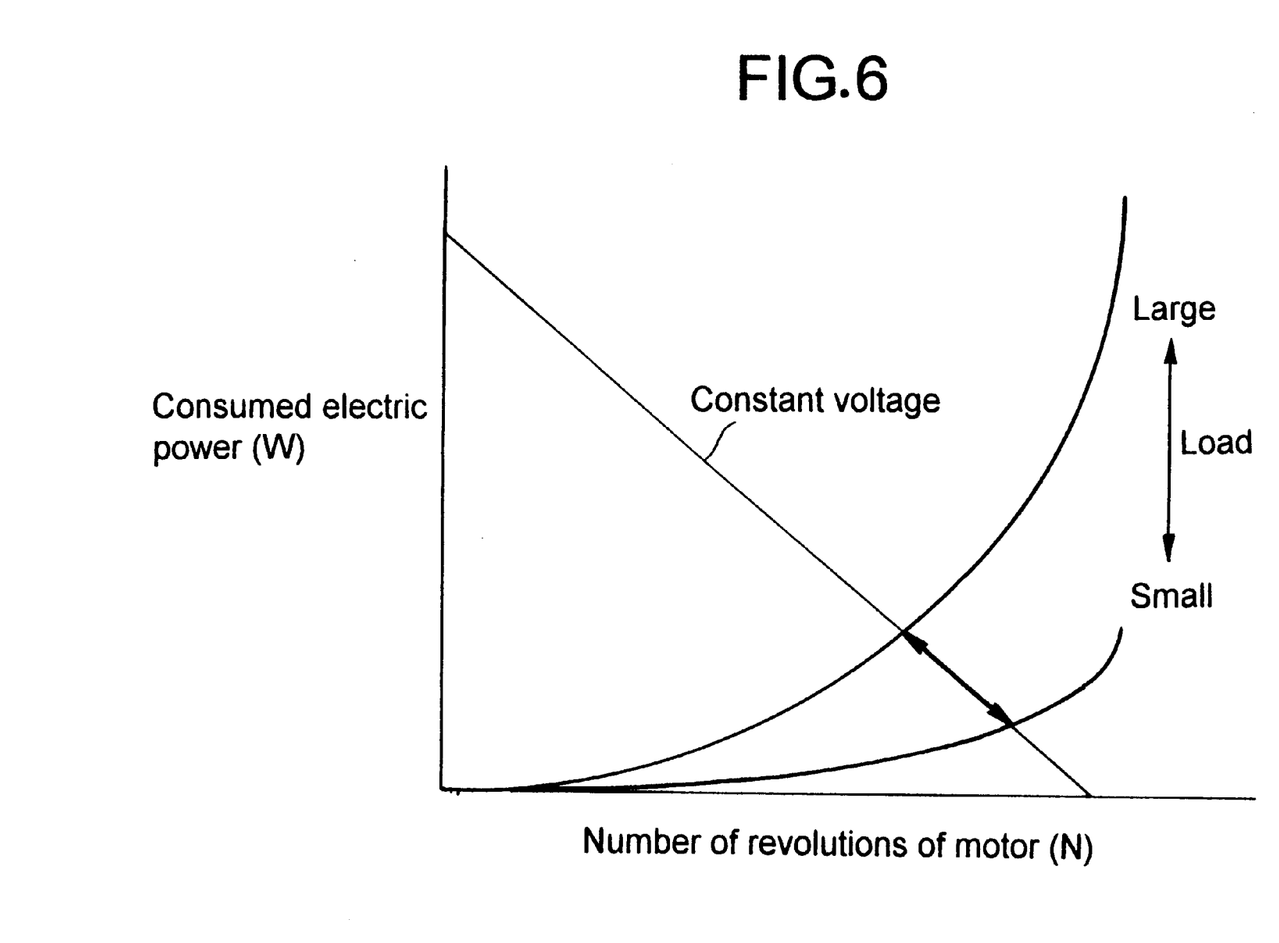
FIG. 6 is a graph illustrating a characteristic of number of revolutions of the motor and consumed power in a conventional electric lawn mower of a battery driven type.

In contrast, in the conventional lawn mower, the voltage is always constant, as shown in FIG. 6. If a variation in load is produced, a variation in number of revolutions of the motor is produced. That is, the variation in load is absorbed by the variation in number of revolutions of the motor.

According to the embodiment of the present invention, the number of revolutions of the motor can be maintained substantially constant irrespective of the variation in load, by the control unit 15, and without using a revolution-number sensor. Therefore, the control unit 15 can be placed in a good environment spaced apart from the output shaft of the motor 4, such that the durability thereof can easily be improved. Moreover, the wiring can be simplified, thereby bringing about a substantial reduction in cost.

In addition, the solar cell 10 is connected to the feed circuit 13 and, during operation of the motor 4, the solar cell 10 drives the motor 4 by cooperation with the battery 5 and during non-operation of the motor 4, the charging of the battery 5 can be carried out by the solar cell 10, whereby the service time of the battery 5 is prolonged.

Then, if the main switch 14 is returned to the OFF position in order to stop the cutting of grass, the braking circuit 19 is operated, thereby applying a reverse load to the motor 4 by a rotative inertial force of the mowing blade B. This causes the motor 4 to be operated as a generator, whereby a resulting electric current flows to the braking circuit 19 and the diode 20. As a result, a braking force is applied to the motor 4, thereby rapidly braking the mowing blade 8.

What is claimed is:

1. An electric lawn mower driven by a battery, said electric lawn mower comprising:

a DC motor having an output shaft;

a mowing blade disposed at an end of said output shaft;

a control unit connected between said motor and said battery for increasing and decreasing the electric current supplied to said motor in accordance with an increase and decrease in load in order to maintain the number of revolutions per second of said motor substantially constant, wherein said control unit control unit comprises an electric current detecting means for detecting a load current flowing in said motor, a pulse generating means for outputting a pulse signal having a pulse width corresponding to an electric current value detected by said electric current detecting means, and a pulse-responsive switch means for adjusting said electric current supplied to said motor in response to a pulse signal output from said pulse generating means, wherein said pulse-responsive switch means is connected in series with said motor, and wherein a duty ratio of said pulse signal output from said pulse generating means is increased in accordance with an increase in electric current detected by said electric current detecting means, wherein the voltage of the battery is detected by said pulse generating means, and the duty ratio of the pulse signal output from said pulse generating means is increased in accordance with a drop of the detected voltage.

2. An electric lawn mower of a battery driven type according to claim 1, further including a solar cell connected in parallel to said battery.

3. An electric lawn mower driven by a battery, said electric lawn mower comprising:

a DC motor having an output shaft;

a mowing blade disposed at an end of said output shaft;

a control unit connected between said motor and said battery for increasing and decreasing the electric current supplied to said motor in accordance with an increase and decrease in load in order to maintain the number of revolutions per second of said motor substantially constant at or near a minimum value permitting a mowing blade to function normally under a heavy load, wherein said control unit comprises an electric current detecting means for detecting a load current flowing in said motor, a pulse generating means for outputting a pulse signal having a pulse width corresponding to an electric current value detected by said electric current detecting means, and a pulse-responsive switch means for adjusting said electric current supplied to said motor in response to a pulse signal output from said pulse generating means, wherein a duty ratio of said pulse signal output from said pulse generating means is increased in accordance with an increase in electric current detected by said electric current detecting means, and wherein a voltage of said battery is detectable by said pulse generating means and said duty ratio of said pulse signal output from said pulse generating means is increased in accordance with a drop of said voltage of said battery.

* * * * *